United States Patent
Palazzo et al.

(10) Patent No.: US 11,675,419 B2
(45) Date of Patent: Jun. 13, 2023

(54) USER-DRIVEN ADAPTATION OF IMMERSIVE EXPERIENCES

(71) Applicant: AT&T Intellectual Property I, L.P., Atlanta, GA (US)

(72) Inventors: Richard Palazzo, Stewartsville, NJ (US); Eric Zavesky, Austin, TX (US); Tan Xu, Bridgewater, NJ (US); Jean-Francois Paiement, Sausalito, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 168 days.

(21) Appl. No.: 17/103,858

(22) Filed: Nov. 24, 2020

(65) Prior Publication Data

US 2022/0164024 A1 May 26, 2022

(51) Int. Cl.
*G06F 40/279* (2020.01)
*G06F 3/01* (2006.01)
*G10L 15/18* (2013.01)
*G06F 40/30* (2020.01)
*G06V 40/16* (2022.01)

(52) U.S. Cl.
CPC ............ *G06F 3/011* (2013.01); *G06F 40/279* (2020.01); *G06F 40/30* (2020.01); *G06V 40/174* (2022.01); *G10L 15/1815* (2013.01)

(58) Field of Classification Search
CPC ........ G06F 3/011; G06F 40/279; G06F 40/30; G06V 40/174; G10L 15/1815
See application file for complete search history.

(56) References Cited

U.S. PATENT DOCUMENTS

| | | | |
|---|---|---|---|
| 2016/0026253 A1* | 1/2016 | Bradski | H04N 13/128 345/8 |
| 2020/0283005 A1* | 9/2020 | Shah | B60H 3/0035 |
| 2020/0349249 A1* | 11/2020 | Weston | G06V 40/70 |
| 2021/0074286 A1* | 3/2021 | Cotting | G06F 3/165 |
| 2022/0165024 A1 | 5/2022 | Zavesky et al. | |

* cited by examiner

*Primary Examiner* — Robert J Michaud (57) ABSTRACT

A method includes obtaining a set of components that, when collectively rendered, presents an immersive experience, extracting a narrative from the set of components, learning a plurality of details of the immersive experience that exhibit variance, based on an analysis of the set of components and an analysis of the narrative, presenting a device of a creator of the immersive experience with an identification of the plurality of the details, receiving from the device of the creator, an input, wherein the input defines a variant for a default segment of one component of the set of components, and wherein the variant presents an altered form of at least one detail of the plurality of details that is presented in the default segment, and storing the set of components, the variant, and information indicating how and when to present the variant to a user device in place of the default segment.

20 Claims, 4 Drawing Sheets

USER-DRIVEN ADAPTATION OF IMMERSIVE EXPERIENCES

The present disclosure relates generally to media distribution, and relates more particularly to devices, non-transitory computer-readable media, and methods for providing adaptive immersive experiences that can be customized in real time for a user.

BACKGROUND

Consumers (e.g., users of media content, hereinafter also referred to as simply "users") are being presented with an ever increasing number of services via which media content can be accessed and enjoyed. For instance, streaming video and audio services, video on demand services, social media, and the like are offering more forms of content (e.g., short-form, always-on, raw sensor feed, etc.) and a greater number of distribution channels (e.g., mobile channels, social media channels, streaming channels, just-in-time on-demand channels, etc.) than have ever been available in the past. As the number of choices available to users increases and diversifies, service providers seeking to retain their customer bases are looking for ways to increase the engagement of their customers with their content.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for providing adaptive immersive experiences that can be customized in real time for a user. In one example, a method performed by a processing system includes obtaining a set of components that, when collectively rendered, presents an immersive experience, extracting a narrative from the set of components, learning a plurality of details of the immersive experience that exhibit variance, based on an analysis of the set of components and an analysis of the narrative, presenting a device of a creator of the immersive experience with an identification of the plurality of the details, receiving from the device of the creator, an input, wherein the input defines a variant for a default segment of one component of the set of components, and wherein the variant presents an altered form of at least one detail of the plurality of details that is presented in the default segment, and storing the set of components, the variant, and information indicating how and when to present the variant to a user device in place of the default segment.

In another example, a non-transitory computer-readable medium may store instructions which, when executed by a processing system in a communications network, cause the processing system to perform operations. The operations may include includes obtaining a set of components that, when collectively rendered, present an immersive experience, extracting a narrative from the set of components, learning a plurality of details of the immersive experience that exhibit variance, based on an analysis of the set of components and an analysis of the narrative, presenting a device of a creator of the immersive experience with an identification of the plurality of the details, receiving from the device of the creator, an input, wherein the input defines a variant for a default segment of one component of the set of components, and wherein the variant presents an altered form of at least one detail of the plurality of details that is presented in the default segment, and storing the set of components, the variant, and information indicating how and when to present the variant to a user device in place of the default segment.

In another example, a device may include a processing system including at least one processor and non-transitory computer-readable medium storing instructions which, when executed by the processing system when deployed in a communications network, cause the processing system to perform operations. The operations may include includes obtaining a set of components that, when collectively rendered, presents an immersive experience, extracting a narrative from the set of components, learning a plurality of details of the immersive experience that exhibit variance, based on an analysis of the set of components and an analysis of the narrative, presenting a device of a creator of the immersive experience with an identification of the plurality of the details, receiving from the device of the creator, an input, wherein the input defines a variant for a default segment of one component of the set of components, and wherein the variant presents an altered form of at least one detail of the plurality of details that is presented in the default segment, and storing the set of components, the variant, and information indicating how and when to present the variant to a user device in place of the default segment.

As discussed above, as the number of services via which users may access media content increases and diversifies, service providers seeking to retain their customer bases are looking for ways to increase the engagement of their customers with their content. Some approaches attempt to maximize a user's engagement with content by making the content immersive. For instance, technologies have emerged in the past few years that can provide various types and degrees of sensory experiences to make a user feel as if he is immersed in the content. As an example, if a user is playing a video game on a head mounted display, and the video game takes place in a desert environment, a smart thermostat could be adjusted to raise the ambient temperature, and a smart lighting system could brighten the ambient lighting, so that the user feels as if he is actually in the desert.

Immersive content is often designed to target a general or "average" audience. However, different users may enjoy different types of content and immersive experiences. For instance, a particular user may be turned off of an immersive news broadcast if the broadcast contains what the user considers to be too many stories about accidents, or if the political reporting is too dry for the user's tastes. Thus, the immersive news broadcast may lose some of the users the broadcast is trying to engage.

Examples of the present disclosure may tailor immersive experiences at the user-level, so that each user may receive a version of the immersive experience that is adjusted to the user's own preferences. As a result, the immersive experience may be slightly (or very) different for each user. For instance, for the immersive news broadcast example, a default version of the news broadcast (e.g., a version targeted to an average audience) could be delivered to a first user. However, for a second user, a personalized version of the news broadcast might filter out certain genres of stories (e.g., stories about accidents), replace filtered out stories with alternate stories (e.g., human interest stories), and/or even replace a news anchor with a favorite character in order to lighten the tone of the news broadcast.

Modifications to the immersive content, and opportunities to implement the modifications in the immersive content, may be created in advance by the creator of the immersive content. In one example, a user may select a specific version of the immersive content (e.g., "default version," "kid-friendly" version, etc.) prior to presentation of the immersive content, and all appropriate modifications for the selected version of the immersive content may be made automatically in response to the selection. Alternatively, the user's reactions to the monitored content may be monitored in real time, and modifications may be made on-the-fly in response to the user's reactions.

Although examples of the present disclosure are discussed within the context of visual media, it will be appreciated that the examples described herein could apply equally to non-visual media, or to media that does not have a visual component. For instance, examples of the present disclosure could be used to dynamically adapt a podcast, a streaming radio station, an audio book, or the like.

Figure 1:
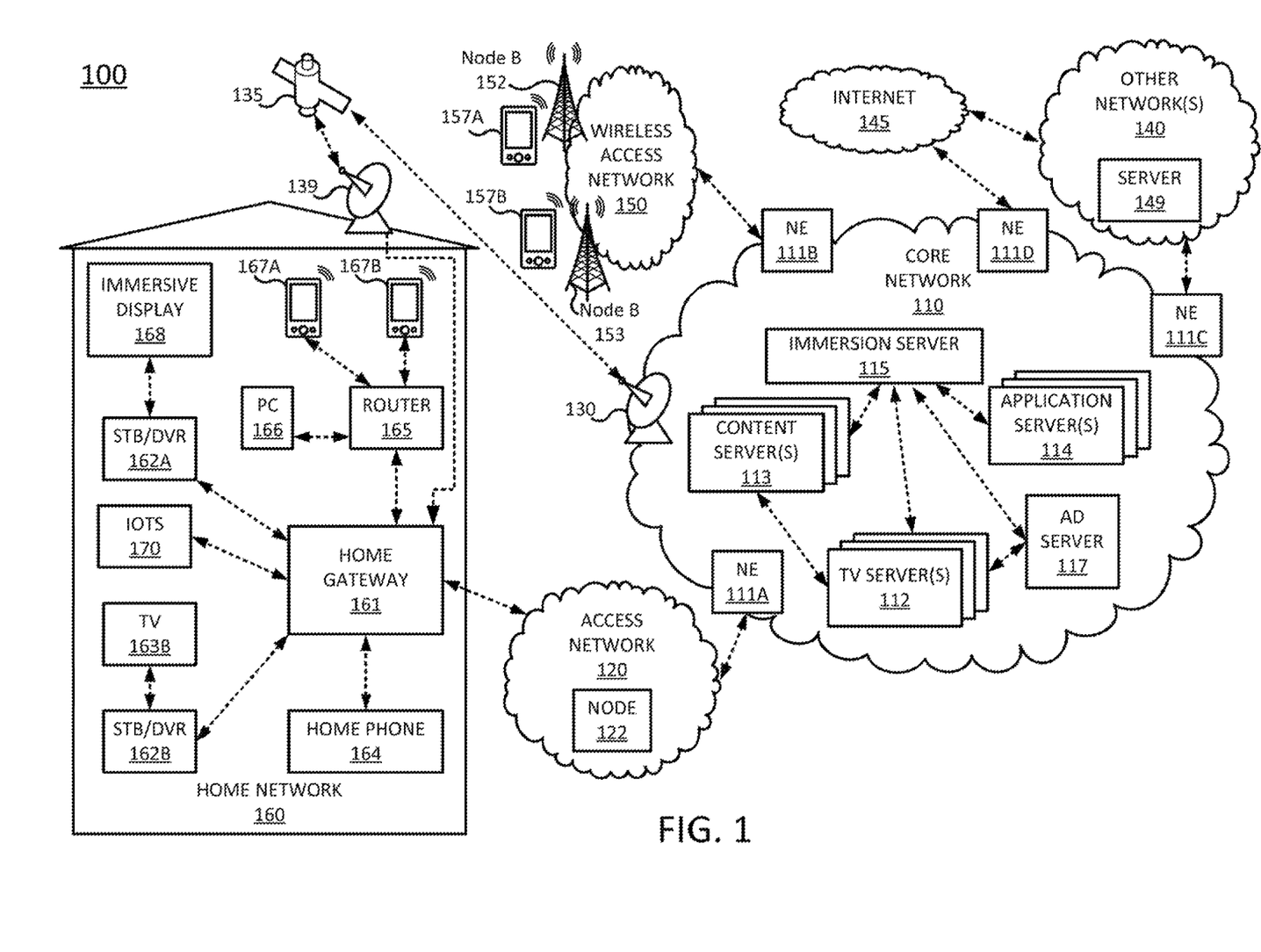
FIG. 1 illustrates an example system in which examples of the present disclosure for providing adaptive immersive experiences that can be customized in real time for a user may operate.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163, home phone 164, router 165, personal computer (PC) 166, immersive display 168, and so forth, with one another and with various other devices via a core network 110, a wireless access network 150 (e.g., a cellular network), an access network 120, other networks 140 and/or the Internet 145. In some examples, not all of the mobile devices and home network devices will be utilized in presenting an immersive experience. For instance, in some examples, presentation of an immersive experience may make use of the home network devices (e.g., immersive display 168, STB/DVR 162A, and/or Internet of Things devices (IoTs) 170), and may potentially also make use of any co-located mobile devices (e.g., mobile devices 167A and 167B), but may not make use of any mobile devices that are not co-located with the home network devices (e.g., mobile devices 157A and 157B).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an immersion server 115 (e.g., an application server). For ease of illustration, various additional elements of core network 110 are omitted from FIG. 1.

In one example, immersion server 115 may detect segments of components of an immersive experience (e.g., visual components, audio components, tactile components, olfactory components, gustatory components, and the like) that may be candidates for the inclusion of variants (e.g., alternate versions of the segments which may be tailored to varying user preferences). For instance, the immersion server 115 may detect a segment of a visual component that includes graphic violence, and may identify the segment as a candidate for the inclusion of variants (e.g., one or more less graphic or less violent versions of the segment). Similarly, the immersion server 115 may detect a segment of an audio component that includes a lot of swearing, and may identify the segment as a candidate for inclusion of variants (e.g., one or more versions of the segment in which the language is toned down, e.g., with the swearing removed or replaced). The creator of an immersive experience may, based on the segments that are detected by the immersion server 115, create one or more variants for the segments. If certain triggers are detected by the immersion server 115 during presentation of a default segment of the immersive experience to a user, then the immersion server may select a variant of the segment (e.g., of a component of the segment) to present to the user in place of the default segment.

To this end, the immersion server 115 may monitor a user's reactions to an immersive experience, which may be delivered to a device in the home network 160 (e.g., one or more of the mobile devices 157A, 157B, 167A, and 167B, the PC 166, the home phone 164, the TV 163, the immersive display 168, and/or the Internet of Things devices (IoTs) 170) by the TV servers 112, the content servers 113, the application servers 114, the ad server 117, and/or and the immersion server 115. For instance, the immersion server 115 may receive data related to the user's reactions directly from the device(s) to which the immersive experience is delivered (e.g., the device presenting the immersive experience to the user). The data may include, e.g., sensor readings from one or more sensors of the device to which the immersive experience is delivered (e.g., cameras, microphones, tactile sensors, biometric sensors, etc.). The data may be received by the immersion server 115 in real time, e.g., as the sensors collect the data. The immersion server 115 may alternatively or in addition receive the data from other devices in the vicinity of the device(s) to which the immersive experience is being delivered. For instance, the data could be collected by one or more IoT devices (e.g., a virtual assistant device, a security system, a wall mounted camera, etc.), by the user's mobile phone or wearable smart device (e.g., smart watch or fitness tracker), or the like.

The immersion server 115 may analyze the data in real time (e.g., as the data is received) in order to estimate the user's current level of satisfaction or comfort with the immersive experience. The immersion server 115 may estimate the user's current level of satisfaction or comfort with the item of immersive experience in a variety of ways. For instance, the immersion server 115 could perform image processing on camera images of the user (e.g., facial analysis of images of the user's face, or image analysis of the user's body language, could yield cues as to the user's level of comfort). Alternatively, the immersion server 115 could perform content analysis on an audio signal of the user (e.g., the user's level of comfort could be indicated by laughing, screaming, crying, etc.; sentiment analysis may be performed on utterances made by the user, such as exclamations of discomfort or fear). In further examples, the immersion server 115 may perform analysis of biometric indicators of the user in order to estimate the user's current level of comfort (e.g., increased heart rate, increased skin conductivity, dilated pupils, and/or other indicators may indicate that the user is scared, while a lowered heart rate, steady breathing, and/or other indicators may indicate that the user is calm). In another example, the user may explicitly request adaptation of a segment of the immersive experience (e.g., by submitting a request via a graphical user interface, a verbal statement, a gesture, or the like).

In response to the estimating the user's level of comfort, the immersion server 115 may select and transmit a variant of a segment of the immersive experience in real time to improve the user's engagement (e.g., satisfaction or level of comfort) with the immersive experience. The variant may comprise an alternate version of the segment that may remove or modify elements of the segment that have been identified as potential sources of discomfort for some users. For instance, if the data collected by the sensors indicates that the user is upset by the number of violent news stories being reported during an immersive news broadcast (e.g., images of the user depicting him looking away, audio of the user depicting him groaning, etc.), then the immersion server 115 may select a variant that presents a different news story with less (or no violence). For instance, the immersion server 115 may select a variant story that shows a light-hearted human interest story or a sports story.

In one example the immersion server 115 may additionally have access to user profiles that store information related to user preferences regarding various types of stimuli and subject matter. The user profiles may be retrieved from network storage, e.g., application servers 114, or by the immersion server 115. For instance the user profiles may be maintained by a network service (e.g., an Internet service provider, a streaming media service, a gaming subscription, etc.). The immersion server 115 may also have access to third party data sources (e.g., server 149 in other network 140), where the third party data sources may comprise historical, background and other data relating to stimuli and subject matter that are known to be common sources of discomfort to users.

The immersion server 115 may interact with television servers 112, content servers 113, and/or advertising server 117, to select which video programs (or other content), advertisements, and/or variants to include in an immersive experience being delivered to a user endpoint device. For instance, the content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements (including product placement objects) that can be selected for presentation to subscribers, e.g., in the home network 160 and at other downstream viewing locations. For example, advertisers may upload various advertising content to the core network 110 to be distributed to various viewers.

Figure 4:
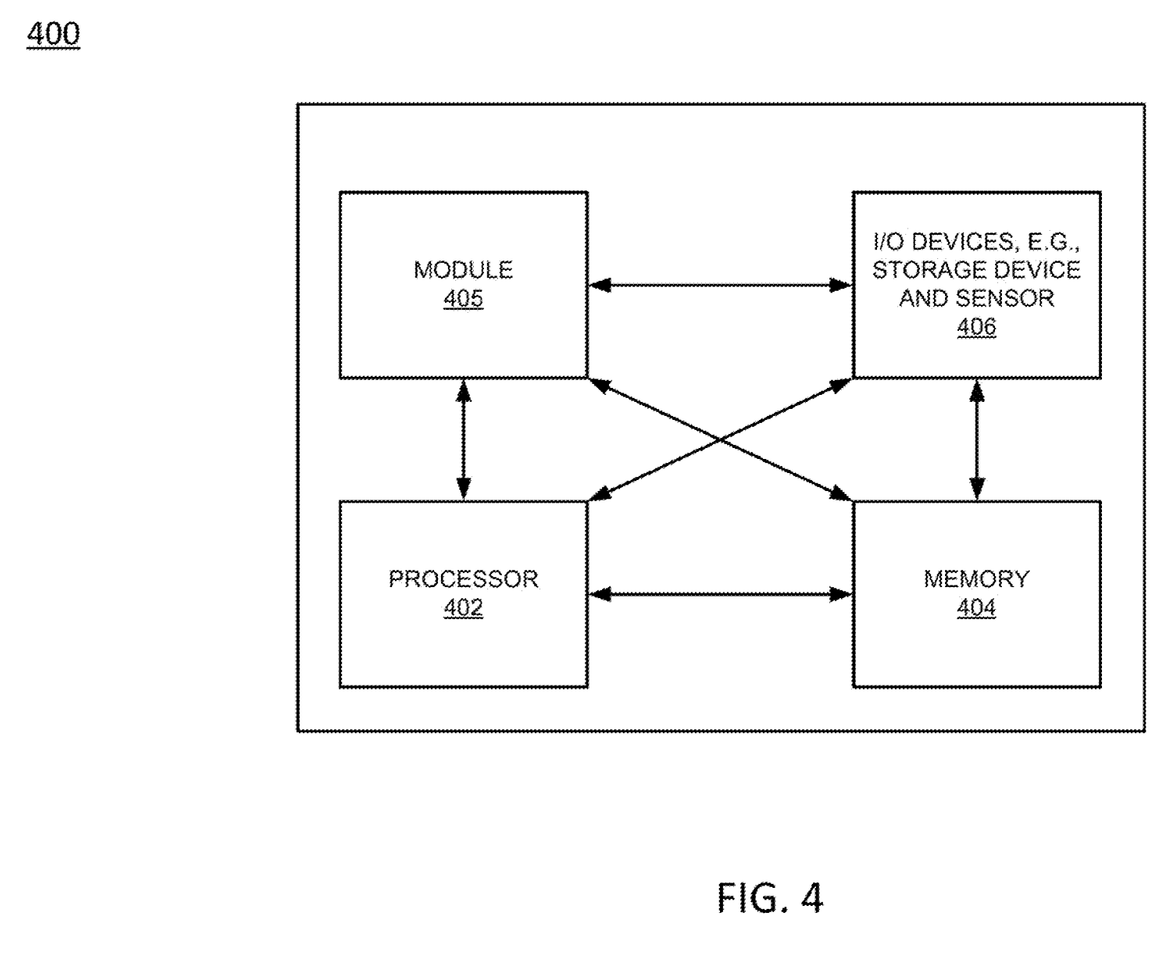
FIG. 4 illustrates an example of a computing device, or computing system, specifically programmed to perform the steps, functions, blocks, and/or operations described herein.

In one example, any or all of the television servers 112, content servers 113, application servers 114, immersion server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a 3rd party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163 and/or immersive display 168 for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, IoTs 170 and so forth.

In one example, router 165 may further communicate with TV (broadly a display) 163 and/or immersive display 168, e.g., where one or both of the television and the immersive display incorporates "smart" features. The immersive display may comprise a display with a wide field of view (e.g., in one example, at least ninety to one hundred degrees). For instance, head mounted displays, simulators, visualization systems, cave automatic virtual environment (CAVE) systems, stereoscopic three dimensional displays, and the like are all examples of immersive displays that may be used in conjunction with examples of the present disclosure. In other examples, an "immersive display" may also be realized as an augmentation of existing vision augmenting devices, such as glasses, monocles, contact lenses, or devices that deliver visual content directly to a user's retina (e.g., via mini-lasers or optically diffracted light). In further examples, an "immersive display" may include visual patterns projected on surfaces such as windows, doors, floors, or ceilings made of transparent materials.

In another example, the router 165 may further communicate with one or more IoTs 170, e.g., a connected security system, an automated assistant device or interface, a connected thermostat, a connected speaker system, or the like. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163 and/or immersive display 168, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
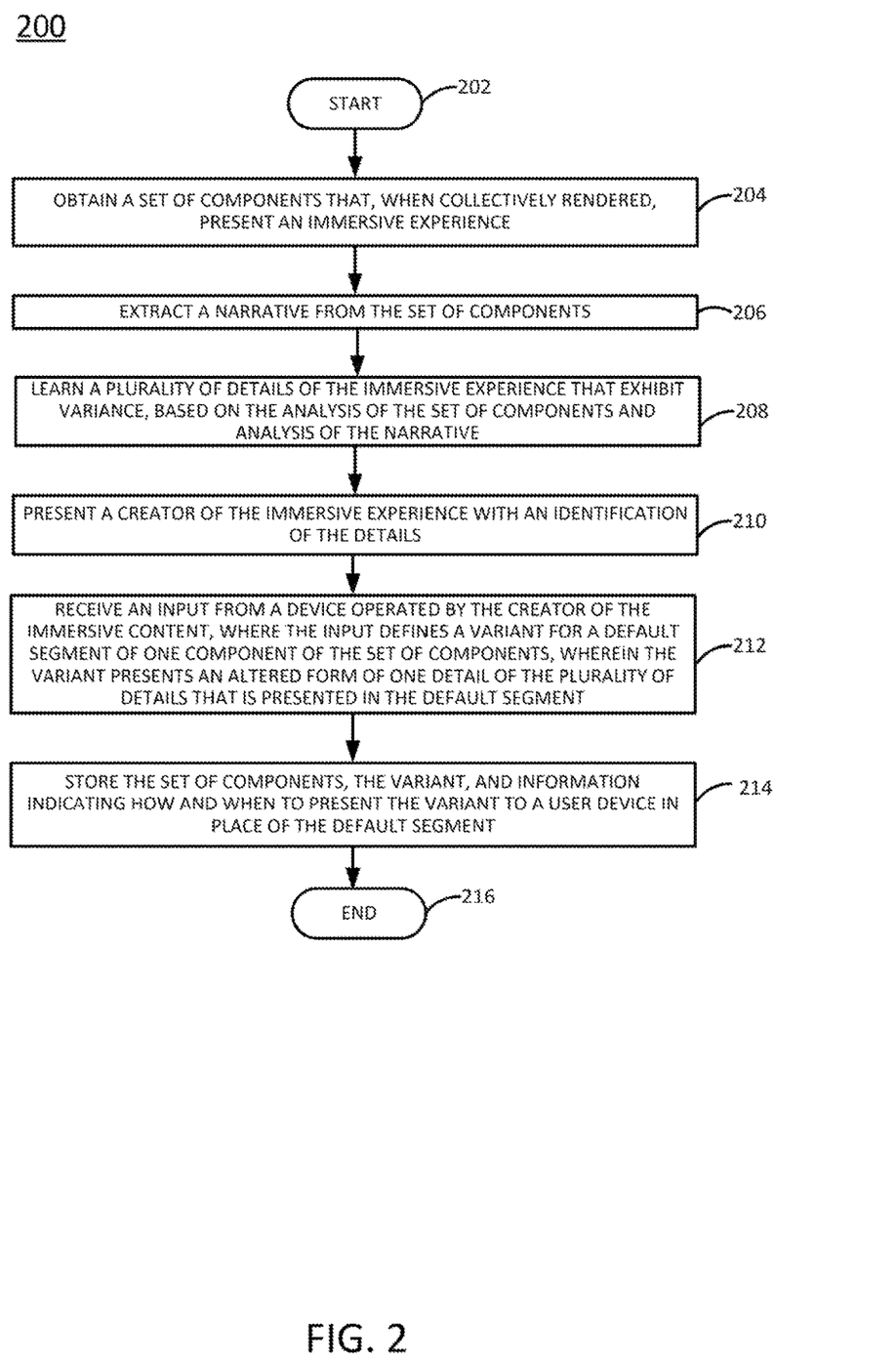
FIG. 2 illustrates a flowchart of an example method for configuring components of an immersive experience to accommodate variations, in accordance with the present disclosure.

FIG. 2 illustrates a flowchart of an example method 200 for configuring components of an immersive experience to accommodate variations, in accordance with the present disclosure. In one example, steps, functions and/or operations of the method 200 may be performed by a device as illustrated in FIG. 1, e.g., immersion server 115 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the immersion server 115 in accordance with the present disclosure. For illustrative purposes, the method 200 is described in greater detail below in connection with an example performed by a processing system, such as processing system 402.

The method 200 begins in step 202. In step 204, the processing system may obtain a set of components that, when collectively rendered, present an immersive experience. For instance, the set of components may include any combination of: a textual component, a visual (e.g., image or video) component, an audio component, a tactile component, an olfactory component, and a gustatory component. The immersive experience that results when the set of components is rendered may comprise, for example, an extended reality video game, an immersive film or television broadcast, a simulation, a virtual tour, or another type of immersive experience. For instance, where the immersive experience is an immersive film, when the set of components is rendered in a time-synchronized manner, the user may be made to feel as if he is in the film rather than simply watching the film. Each component may be configured to be rendered by a separate device, or two or more of the components may be configured to be rendered by the same device. For instance, where a scene of an immersive film takes place in a desert, a head mounted display may render both a visual component and an audio component of the scene (e.g., to present a 360 degree view that makes it look and sound like the user is in the desert), while an Internet-connected thermostat may render a tactile component of the scene (e.g., by raising an ambient temperature to make the user feel as if he is in the desert).

In one example, one or more of the components in the set of components may be tagged with metadata that indicates at least one of: a narrative of the immersive experience, an appearance of characters in the immersive experience, and an appearance of objects within the immersive experience. For instance, where the immersive experience is an animation of a dancing soft drink can, metadata associated with the components of the immersive experience may indicate that the animation is created from two still frames of the soft drink can and a dance floor.

In step 206, the processing system may extract a narrative from the set of components. In one example, the processing system may perform one or more analysis techniques on the individual components in order to derive cues from which the narrative can be inferred. For instance, optical character recognition and/or text recognition can be performed on a textual component (or on text appearing in a non-textual visual component) to recognize words (e.g., place names appearing on street signs, subtitles, etc.), while semantic analysis could be used to extract meaning from the words (e.g., a tone that is aggressive, friendly, sad, etc.). Similarly, automatic speech recognition could be performed on an audio component in order to recognize words that are spoken, sung, or the like, while semantic analysis techniques could be used to extract meaning from the words (e.g., dialogue, exposition, etc.). Facial recognition or object recognition techniques could be performed on a non-textual visual component to recognize actors, characters, objects, and the like. Information extracted from different components could be aggregated in order to generate an understanding of characters and story. For instance, speech spoken by a character could be understood to convey some particular meaning or sentiment (e.g., the character is excited for something that is about to happen) based on analysis of the audio component, while the speech could also be understood to be associated with that character based on analysis of the visual component (e.g., showing that the character is the one who is speaking the words).

In step 208, the processing system may learn a plurality of details of the immersive experience that exhibit variance, based on the analysis of the set of components and analysis of the narrative. Put another way, the processing system learns how different aspects of the immersive experience may change over time. As an example, by analyzing a visual component, the processing system may be able to detect variances in a character's appearance. For instance, the character's facial expressions (e.g., how the character looks when he is angry versus how the character looks when he is scared, etc.), costumes (e.g., a super hero's costume versus his alter ego's more nondescript clothes), and the like may change over the course of the immersive experience. Similarly, by analyzing the narrative, the processing system may be able to detect variances in tone. For instance, the tone or sentiment of different scenes may change based on actions that characters have taken, dialogue, events, and the like.

In one example, learning variances in the narrative may also include learning which elements of the narrative are invariable (i.e., do not or cannot change). For instance, different segments of the narrative may depend on other segments of the narrative (e.g., a super hero cannot use his super powers until he has first experienced the laboratory accident that caused his super powers). Thus, in some cases, some segments or scenes of the immersive experience may have to occur in a defined or fixed order, although events occurring between the scenes may have more room for variance. Techniques such as syntactic sequence learning (e.g., recurrent neural networks (RNN), hidden Markov models (HMM), and long-short term memory models (LSTM)) may be used to identify when a narrative includes scenes that depend on other scenes.

Similarly, learning variances in characters or objects may also include learning which aspects of the characters or objects are persistent or invariable. For instance, the processing system may, based on analysis of the set of components, learn that a first character always appears together with a second character, or with a specific object (e.g., a super hero and his sidekick, or a super hero and his weapon or vehicle).

In some examples, details of the immersive experience that are invariable may be defined in advance by the content creator and tagged in the metadata of the set of components to indicate that there is no room for variance. For instance, a particular scene of a visual component may be tagged to indicate that a product placement in the scene cannot be changed or removed (e.g., due to a contractual agreement between the content creator and the product manufacturer). In other examples, the content creator may tag certain components or parts of components as invariable in order to maintain an artistic vision for the immersive experience.

In step 210, the processing system may present a creator of the immersive experience with an identification of the plurality of details of the immersive experience (e.g., elements of the components and/or narrative) that exhibit variance. For instance, the processing system may tag the components in the set of components to indicate which segments of the components could potentially be varied to create an alternate version of the immersive experience (e.g., alternate relative to a default version in which no aspects of the set of components or the narrative are varied). In another example, the details of the immersive experience that have room for variance may be identified in a list form or as thumbnail images. Possible variances for a component may also be identified. For instance, in a visual component of the immersive experience, a character's costume during a particular scene may be identified as a detail that can be varied, based on the character wearing multiple different costumes throughout the visual component. The different costumes could also be identified as possible variations for the costume that is worn by the character in the identified scene.

In step 212, the processing system may receive an input from a device operated by the creator of the immersive content, where the input defines a variant for a default segment (e.g., scene, chapter, or the like) of one component of the set of components, wherein the variant presents an altered form of one of the details of the plurality of details that is presented in the default segment. In one example, the detail of the immersive experience for which the variance is defined may be one of the details that is identified in step 210. In one example, the input may comprise a manipulation of a graphical element that is mapped to different gradations of variance for a detail. For instance, a slider could be used to manipulate a character's facial expression, where one end of the slider is mapped to a smile, the other end of the slider is mapped to a frown, and the points of the slider in the middle are mapped to facial expressions that fall somewhere between a smile and a frown.

In another example, the input may comprise a definition of a machine learning objective function for the detail, where the machine learning objective function may alter the detail in order to elicit a desired reaction from a user. For instance, the creator of the immersive content may specify that a detail associated with a given scene may be varied as necessary in order to retain the user's attention, to surprise the user, or the like. Similarly the creator of the immersive content may specify that certain variances should be triggered by specific audience reactions. For instance, the creator of the immersive content may define a less visually gory version of a fight scene that can be presented to a user when the user appears to be uncomfortable with the original version of the fight scene (as discussed in greater detail below in connection with FIG. 3). As another example, the creator of the immersive content may define an audio scene that contains less swearing than an original version of the scene, which can be presented when children are part of the immersive experience's audience. As yet another example, the creator of the immersive content may elect to provide core dialogue interactions for the narrative (e.g., chat bot policies) which can accommodate on-line inputs from the user.

In some examples, the creator of the immersive content may also define variances for details that were not automatically identified by the processing system. That is, although the processing system may help by automatically identifying details that may be good candidates for defining variances, the creator of the immersive content may also elect to provide variances for details that were not identified by the processing system.

In step 214, the processing system may store the set of components for the immersive experience, along with the variant and information (e.g., metadata) indicating how and when to present the variant to a user device in place of the default segment. For instance, if the permissible variance is the removal of swearing during a scene in an audio component of the immersive experience, the processing system may also store an alternate audio component for at least that scene (where the alternate component does not include the swearing).

The method 200 may end in step 216.

Figure 3:
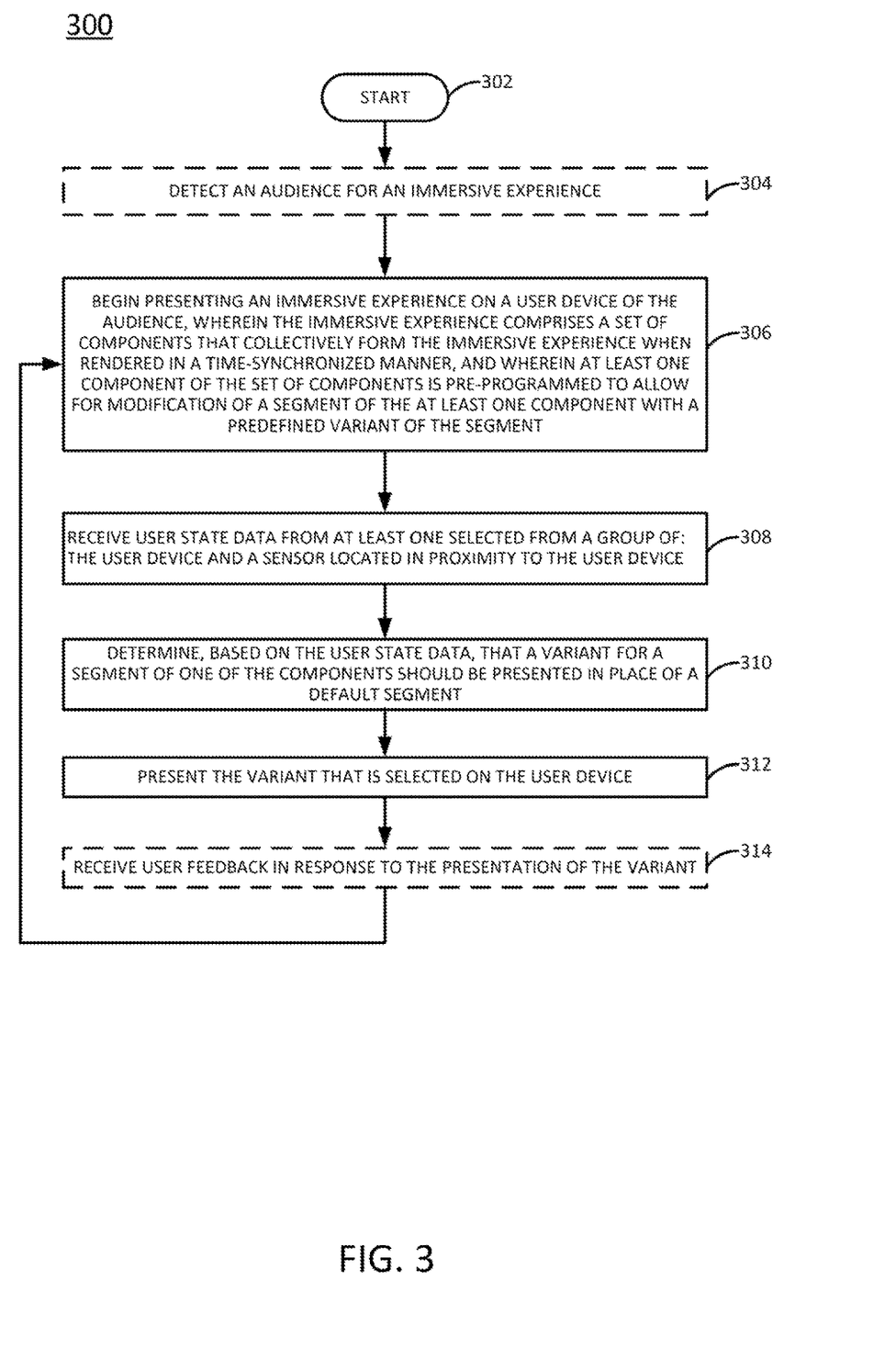
FIG. 3 illustrates a flowchart of an example method for presenting adaptive immersive content, in accordance with the present disclosure.

FIG. 3 illustrates a flowchart of an example method 300 for presenting adaptive immersive content, in accordance with the present disclosure. In one example, steps, functions and/or operations of the method 300 may be performed by a device as illustrated in FIG. 1, e.g., immersion server 115 or any one or more components thereof. In one example, the steps, functions, or operations of method 300 may be performed by a computing device or system 400, and/or a processing system 402 as described in connection with FIG. 4 below. For instance, the computing device 400 may represent at least a portion of the immersion server 115 in accordance with the present disclosure. For illustrative purposes, the method 300 is described in greater detail below in connection with an example performed by a processing system, such as processing system 402.

The method 300 begins in step 302. In optional step 304 (illustrated in phantom), the processing system may detect an audience for an immersive experience. In one example, detecting the audience may comprise identifying at least one audience member (e.g., John Smith). In another example, however, detecting the audience may more generally comprise identifying a demographic makeup of the audience (e.g., a single adult versus a group of young children versus a family with teenagers).

In one example, the audience may be detected using data collected by one or more sensors that are co-located with a user device on which the immersive experience is to be presented. For instance, if the immersive experience is to be presented on a head mounted display, then a camera on the head mounted display could capture images of the user for identification purposes, or a microphone on the head mounted display could capture audio of the user for identification purposes. In another example, the immersive experience could be presented on an immersive display, and an IoT device co-located with the immersive display, such as an Internet-connected security system including cameras, could capture data that can be used for identification or detection purposes. In yet another example, audience detection may be facilitated by explicit user input. For instance, the user may log into an account with a service provider who is presenting the immersive experience, thereby identifying himself to the processing system. The user could also explicitly indicate to the system the identities, ages, and/or other information about the audience members, or could select a profile associated with the account that is configured with settings that are specific to a given audience (e.g., kid-friendly settings, minimize violence, always replace character A with character B, etc.).

In step 306, the processing system may begin presenting an immersive experience on a user device of the audience, wherein the immersive experience comprises a set of components that collectively form the immersive experience when rendered in a time-synchronized manner, and wherein at least one component of the set of components is pre-programmed to allow for modification of a segment of the at least one component with a predefined variant of the segment. As discussed above, the immersive experience may comprise, for example, an XR video game, an immersive film or television show, a simulation, a virtual tour, or the like. Presenting the immersive experience may comprise sending commands to the user device and/or one or more other devices that are co-located with the user device (e.g., IoT devices such as smart thermostats, smart lighting systems, smart audio systems, virtual assistant devices, and the like), where the commands instruct the user device and/or the one or more other devices to play a component of the set of components. The commands may be sent such that the devices play the components in a time-synchronized manner (e.g., audio is properly synchronized with the visuals, tactile effects are rendered in sync with events that are seen and/or heard, etc.).

In step 308, the processing system may receive user state data from at least one selected from a group of: the user device and a sensor located in proximity to the user device. As with the sensor that detect the audience, the sensor may be part of the user device. For instance, a head mounted display that is used to present an extended reality video game might include skin conductivity sensors positioned to contact the user's face, a microphone to capture user audio (e.g., utterances, screams, etc.), or cameras focused on the user's eyes (which can be used to detect pupil dilation, rapid blinking, and other ocular characteristics). In another example, the sensor may be part of another device that is co-located with the user device. For instance, the user device may be a head mounted display, but the other device may be a fitness tracker that the user is wearing, where the fitness tracker may include a sensor that is able to detect the user's skin conductivity, heart rate, blood oxygenation, or other biometrics. Alternatively, the user device may be a head mounted display, but the other device may be an audio sensor or a camera that is part of an IoT device (e.g., a smart security system, a virtual assistant device, or the like).

In another example, the user state data may comprise an explicit request from the user that is conveyed via a user input device of the user device and/or the sensor. For instance, the user may press a button, manipulate a slider, or make a selection via a graphical user interface (e.g., on the user device, on a mobile phone, etc.) to indicate that the user wishes for the immersive experience to be modified (e.g., made less violent or scary, made more lighthearted, replacing one actor with another actor, etc.). In another example, the user may verbally request the modification, where the verbal request is detected by a microphone. In another example, the user may make a gesture (e.g., waving a hand, thumbs up, thumbs down, etc.) that is mapped to a specific command, where the gesture may be detected by a camera.

In one example, the sensor may send the user state data to the processing system continuously, so that the processing system can detect any significant changes in the user state data as quickly as possible. In another example, to save bandwidth and/or processing resources, the sensor may send the user state data to the processing system on a periodic basis (e.g., every x seconds, once a minute, or the like). In another example, the sensor may send the user state data to the processing system whenever the user state data changes by more than a threshold within a defined window of time (e.g., a change of more than x units of measure within y seconds or minutes). In another example, the sensor may send the user state data whenever a segment of one of the components that has been tagged as having available variants is about to be played (e.g., x seconds or frames before the segment having the available variants is played). In another example, where the user state data comprises an explicit user request, the sensor may send the user state data whenever an explicit user request is detected.

In step 310, the processing system may determine, based on the user state data, that a variant for a segment of one of the components should be presented in place of a default segment. For instance, the user state data received in step 308 may comprise a reading of the user's current heart rate. If the user's current heart rate is greater than some threshold (where the threshold heart rate may be user-specific or based on an average user heart rate), then the processing system may determine that the user is scared, and that a less scary variant of the segment should be presented. In another example, the user state data received in step 308 may comprise video of the user that appears to show that the user is disinterested or distracted (e.g., is scrolling on his smart phone, looking away, reading a book, etc.) If the user appears disinterested or distracted, then the processing system may determine that a more exciting variant of the segment should be presented in an attempt to refocus the user's attention. In another example, the user state data may comprise an utterance made by the user, such as, "Not more political ads." Audio processing techniques, such as voice recognition, sentiment analysis, and the like, may allow the processing system to extract meaning the utterance (e.g., the user does not want to see any more political advertisements), and the processing system may select a variant of the segment accordingly (e.g., may avoid presenting a default or variant segment that includes political advertisements). In further examples, if the immersive experience is being presented in a dark room, then a variant that adjusts the brightness of the visual component(s) of the immersive experience may be selected accordingly (e.g., a variant that dims the brightness to match the ambient lighting or increases the brightness so that the visual components are easier to see).

In step 312, the processing system may present the variant that is selected on the user device. In one example, where the processing system is streaming the immersive experience to the user device, the processing system may simply replace the default segment of the component with the variant that is selected. Once the variant ends, the processing system may resume streaming the immersive experience including the default segments for any upcoming segments of the component. However, in another example, the processing system may simply send the default segment, independent of a remainder of the segments of the components, along with instructions on when to play the variant so that the variant overrides or replaces the default segment.

In optional step 314 (illustrated in phantom), the processing system may receive user feedback in response to the presentation of the variant. In one example, the immersive experience may have a visual indication or an audio indication that a variant was previously presented or is presently being presented, so that user is made aware of such presentation replacement. In one example, the user feedback may comprise explicit feedback indicating whether or not the user was satisfied with the presentation of the variant. For instance, the first user may provide a signal via an interactive dialog to indicate whether or not he was satisfied with the variant. In another example, the sensors may detect a predefined gesture or statement that indicates that the first user is satisfied (e.g., the first user may say "that's better," or may give a thumbs up).

Alternatively, the user feedback may comprise implicit feedback that may be inferred based on the same user data that selection of the variant was based on. For instance, if the variant was presented in response to the user's heart rate rising above a threshold heart rate, and the first user's heart rate lowers to below the threshold heart rate after the variant is presented, then the processing system may infer that the user was satisfied with presentation of the variant.

The user feedback may be used by the processing system to inform the manner in which future segments of the components of immersive experience (and other immersive experiences which may be presented to the user in the future) are replaced with variants. For instance, if the variant presented in step 312 is deemed to have been ineffective, or if the user indicates dissatisfaction with the presentation of the variant, then the processing system may replace similar segments with a different type of variant (or no variant at all). Alternatively, if the variant presented in step 312 is deemed to have been effective, or if the user indicates satisfaction with the presentation of the variant, then the processing system may replace similar segments with a similar type of variant.

The method 300 may then return to step 306, and the processing system may proceed as described above to present the immersive experience, substituting variants as deemed necessary. Thus, steps 306-314 may be repeated any number of times until presentation of the immersive experience concludes (e.g., the immersive experience may come to a scheduled end, or the user may pause or exit the immersive experience before a scheduled end).

The methods 200 and 300 therefore allow the presentation of an immersive experience to be dynamically adapted, in real time, in response to a user's preferences and reactions, which ideally will make for a more enjoyable and engaging experience for the user. Segments that cause user discomfort or dissatisfaction can be replaced with variants designed to ease the user's discomfort or dissatisfaction. Moreover, the same techniques that are used to adapt the immersive experience to user preferences and reactions could also be used to adapt the types of advertisements (if any) that are presented as part of the immersive experience. For instance, different versions of a commercial for the same product may be created (e.g., a funny version, a serious version, and extended version, and the like), and the version that is best suited to the user's reactions and preferences could be selected for presentation to the user. Similarly, if a segment of the immersive experience includes a product placement, the specific product that is placed in the segment could be tailored to the user's preferences (e.g., if the placed product is a soft drink, render the soft drink as the user's preferred brand of cola rather than a different brand).

As discussed above, in some examples, variants may be selected based on user preferences that are indicated in a user profile. In further examples, the user profile could be compared against trending topics that are identified based on aggregated user feedback to identify variants that may be of interest to the user. For instance, if the immersive experience is a news broadcast, a plurality of trending news stories that are popular with a population of users may be identified. If the user has indicated in his profile that he prefers more lighthearted news stories, then any lighthearted news stores from among the trending news stories may be selected as possible variants that could be presented to the user in place of less lighthearted default news stories.

In further examples, user-created variants may be permitted to be integrated into the immersive experience. The examples above describe variants for segments of immersive content that are created and pre-programmed by the creator of the immersive content. However, the creator may also allow users to submit their own proposed variants for segments of the immersive experience. The creator may vet the user-created variants for conformance to certain requirements (e.g., certain aspects of a segment, such as a product placement or a sequence of events, may not be permitted to be changed). The user-created segments could be made available for the user who created the segment only, or for a wider audience including other users.

In further examples, information regarding user data (e.g., reactions to segments and content of different tones, types, and genres), requests, and feedback regarding variants can also be provided to the creators (e.g., only with user consent) of the immersive experiences to help the creators tune their immersive experiences to be more adaptable to varying user preferences. For instance, a particular scene of an immersive film may be observed, based on user reactions and requests, to make many users uncomfortable. As an example, the scene may depict an actor who has recently become a controversial or polarizing figure. However, the creator of the film may not have considered that the scene could be a possible source of discomfort for users, and thus, may not have provided any variants for the scene. Upon detecting that a significant number of users (e.g., a number greater than a threshold) have experienced discomfort and/or requested adaptation when experiencing the scene, the creator of the film may create one or more variants in order to minimize user discomfort. For instance, the creator may create variants in which the actor is removed or replaced with a different actor. Similarly, even where the creator of an immersive experience has provided one or more variants for a scene, if the one or more variants have been determined to be ineffective in minimizing discomfort for some number of users, the creator may identify a need to create a new variant for the scene.

Since the method 300 relies to some degree on user monitoring throughout the presentation of the immersive experience, the method 300 could be provided as an opt-in enhancement (e.g., the user consent must be received before the monitoring of the user can be implemented) to the immersive experience. For instance, some users may find constant monitoring of their reactions to the immersive experience to be intrusive or distracting, while other users may feel that the monitoring enhances the experience by providing timely adaptations.

It should be noted that the methods 200 and 300 may be expanded to include additional steps or may be modified to include additional operations with respect to the steps outlined above. In addition, although not specifically specified, one or more steps, functions, or operations of the methods 200 and 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for providing adaptive immersive experiences that can be customized in real time for a user, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the methods 200 and 300 as discussed above are implemented in a distributed or parallel manner for a particular illustrative example, i.e., the steps of the above method 200 or 300 or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 200 and 300. In one example, instructions and data for the present module or process 405 for providing adaptive immersive experiences that can be customized in real time for a user (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing adaptive immersive experiences that can be customized in real time for a user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    obtaining, by a processing system including at least one processor, a set of components that, when collectively rendered, presents an immersive experience;
    extracting, by the processing system, a narrative from the set of components;
    learning, by the processing system, a plurality of details of the immersive experience that exhibit variance and at least one element of the narrative that is invariable, based on an analysis of the set of components and an analysis of the narrative, wherein the at least one element of the narrative that is invariable comprises an order in which two scenes of the narrative must be presented to a user device that the immersive experience is presented;
    presenting, by the processing system, to a device of a creator of the immersive experience with an identification of the plurality of the details;
    receiving, by the processing system, from the device of the creator, an input, wherein the input defines a variant for a default segment of one component of the set of components, and wherein the variant presents an altered form of at least one detail of the plurality of details that is presented in the default segment; and
    storing, by the processing system, the set of components, the variant, and information indicating how and when to present the variant to the user device in place of the default segment.

2. The method of claim 1, wherein the set of components comprises at least one of: a textual component, a visual component, an audio component, a tactile component, an olfactory component, or a gustatory component.

3. The method of claim 2, wherein the extracting comprises:
    performing, by the processing system, text recognition on the textual component to recognize words contained in the textual component; and
    performing, by the processing system, semantic analysis to extract meaning from the words.

4. The method of claim 2, wherein the extracting comprises:
    performing, by the processing system, text recognition on text appearing in the visual component to recognize words; and
    performing, by the processing system, semantic analysis to extract meaning from the words.

5. The method of claim 2, wherein the extracting comprises:
    performing, by the processing system, speech recognition on the audio component to recognize words contained in the audio component; and
    performing, by the processing system, semantic analysis to extract meaning from the words.

6. The method of claim 2, wherein the extracting comprises:
    performing, by the processing system, facial recognition on the visual component to recognize actors and characters appearing in the visual component.

7. The method of claim 2, wherein the extracting comprises:
    performing, by the processing system, object recognition on the visual component to recognize objects appearing in the visual component.

8. The method of claim 2, wherein the extracting comprises:
    aggregating, by the processing system, information extracted from at least two different components of the set of components in order to generate an understanding of at least one character and at least one story in the immersive experience.

9. The method of claim 1, wherein a detail of the plurality of details comprises at least one of: a facial expression of a character appearing in the immersive experience or a costume worn by the character.

10. The method of claim 1, wherein a detail of the plurality of details comprises a tone of the narrative.

11. The method of claim 1, wherein the identification comprises a plurality of metadata tags, wherein each tag of the plurality of metadata tags identifies one detail of the plurality of details.

12. The method of claim 1, wherein the input comprises a manipulation of a graphical element that is mapped to different gradations of variance for the at least one detail.

13. The method of claim 1, wherein the input comprises a definition of a machine learning objective function for the at least one detail, wherein the machine learning objective function alters the at least one detail in order to elicit a desired reaction from a user to whom the immersive experience is presented.

14. The method of claim 1, further comprising:
presenting, by the processing system, the immersive experience on the user device of a user;
receiving, by the processing system, user state data from at least one of:
the user device or a sensor co-located with the user device; and
presenting, by the processing system, the variant in place of the default segment, in response to the user state data.

15. The method of claim 14, wherein the user state data indicates a reaction of the user to the default segment.

16. The method of claim 14, wherein the user state data comprises an explicit user request to adjust the default segment.

17. The method of claim 14, further comprising:
receiving, by the processing system, a request from the user to alter another default segment of another component of the set of components for which a variant does not exist; and
notifying, by the processing system, the creator that a variant was requested for the another default segment.

18. A non-transitory computer-readable medium storing instructions which, when executed by a processing system including at least one processor, cause the processing system to perform operations, the operations comprising:
obtaining a set of components that, when collectively rendered, presents an immersive experience;
extracting a narrative from the set of components;
learning a plurality of details of the immersive experience that exhibit variance and at least one element of the narrative that is invariable, based on an analysis of the set of components and an analysis of the narrative, wherein the at least one element of the narrative that is invariable comprises an order in which two scenes of the narrative must be presented to a user device that the immersive experience is presented;
presenting to a device of a creator of the immersive experience with an identification of the plurality of the details;
receiving from the device of the creator, an input, wherein the input defines a variant for a default segment of one component of the set of components, and wherein the variant presents an altered form of at least one detail of the plurality of details that is presented in the default segment; and
storing the set of components, the variant, and information indicating how and when to present the variant to the user device in place of the default segment.

19. A device comprising:
a processing system including at least one processor; and
a non-transitory computer-readable medium storing instructions which, when executed by the processing system, cause the processing system to perform operations, the operations comprising:
obtaining a set of components that, when collectively rendered, presents an immersive experience;
extracting a narrative from the set of components;
learning a plurality of details of the immersive experience that exhibit variance and at least one element of the narrative that is invariable, based on an analysis of the set of components and an analysis of the narrative, wherein the at least one element of the narrative that is invariable comprises an order in which two scenes of the narrative must be presented to a user device that the immersive experience is presented;
presenting to a device of a creator of the immersive experience with an identification of the plurality of the details;
receiving from the device of the creator, an input, wherein the input defines a variant for a default segment of one component of the set of components, and wherein the variant presents an altered form of at least one detail of the plurality of details that is presented in the default segment; and
storing the set of components, the variant, and information indicating how and when to present the variant to the user device in place of the default segment.

20. The method of claim 1, wherein a first scene of the two scenes must be presented before a second scene of the two scenes is presented, but an order in which additional scenes occurring between the first scene and the second scene are presented is variable.

* * * * *